(No Model.)
E. A. SNOW.
PICTURE HANGER.
No. 480,632. Patented Aug. 9, 1892.
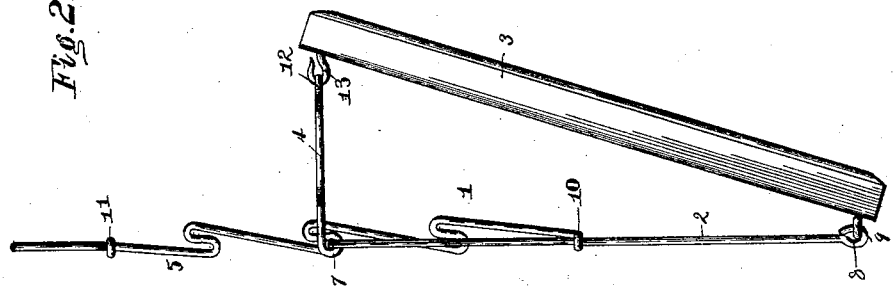
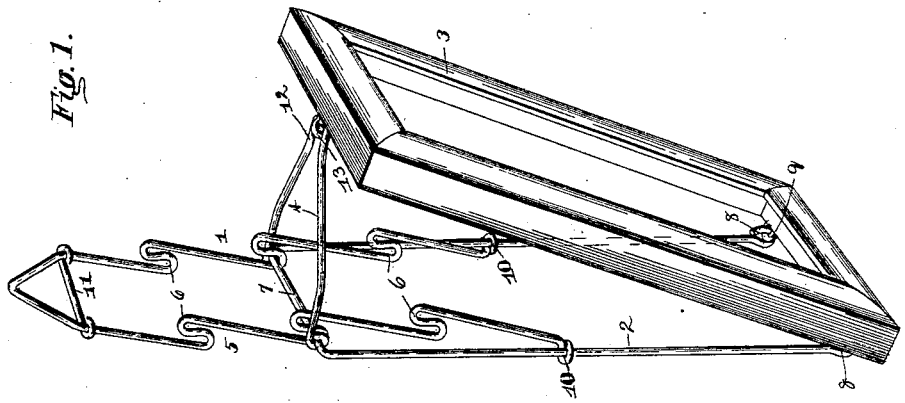
Witnesses
Chas. A. Ford.
H. T. Riley
Inventor
Elwin A. Snow.
By his Attorneys,
C. A. Snow & Co.

UNITED STATES PATENT OFFICE.

ELWIN A. SNOW, OF JACKSONVILLE, NEW YORK.

PICTURE-HANGER.

SPECIFICATION forming part of Letters Patent No. 480,632, dated August 9, 1892.

Application filed November 17, 1891. Serial No. 412,154. (No model.)

*To all whom it may concern:*

Be it known that I, ELWIN A. SNOW, a citizen of the United States, residing at Jacksonville, in the county of Tompkins and State of New York, have invented a new and useful Picture-Hanger, of which the following is a specification.

The invention relates to improvements in picture-hangers.

The object of the present invention is to provide a device which will enable a picture to be readily hung and to be adjusted to the desired height.

The invention consists in the construction and novel combination and arrangement of parts hereinafter fully described, illustrated in the accompanying drawings, and pointed out in the claims hereto appended.

In the drawings, Figure 1 is a perspective view of a picture-hanger constructed in accordance with this invention and shown supporting a picture. Fig. 2 is a side view of the device.

Like numerals of reference indicate corresponding parts in all the figures of the drawings.

1 designates a picture-hanger comprising a frame 2, attached to the bottom of a picture-frame 3, a hinged bail 4, connecting the upper end of the frame 2 with the top of the picture-frame, and an adjustable bail 5, mounted on the frame 2 and provided at its sides with a series of hooks 6, adapted to engage the frame 2, whereby the picture is secured in its adjustment. The frame 2 is approximately U-shaped and is composed of a transverse portion 7 and sides which are provided at their lower ends with hooks 8, linked into screw-eyes 9 at the bottom of the picture-frame 3 and closed. The adjustable bail is provided at its sides with the integral hooks 6, which are formed by bending the metal and which are adapted to engage the transverse portion 7 of the frame 2. The lower ends of the sides of the bail are provided with eyes 10, extending horizontally from the bail and receiving sides of the frame, whereby the bail is adapted to be moved longitudinally on the frame, and at the upper ends of the bail the sides converge and are supported by a transverse brace 11. The hinged bail is V-shaped and is provided at its ends with eyes to receive the transverse portion 7 and has an U-shaped bend 12 at its apex adapted to engage the hook 13 at the top of the picture-frame. The converging upper end of the adjustable bail is suspended from a suitable nail or hook and a picture may be adjusted to the desired height by simply lifting the same and engaging the transverse portion of the frame 2 in the desired hooks.

It will be seen the picture-hanger is simple and comparatively inexpensive in construction, adapted to be readily attached to a picture, and is capable of maintaining a picture in proper position at the desired elevation.

What I claim is—

1. A picture-hanger comprising an approximately U-shaped frame designed to have its lower end attached to the bottom of a picture, a bail connected to the top of the frame and designed to be fastened to the top of a picture, and an adjustable bail having its ends connected with and sliding on the sides of the frame and provided with means for securing it in its adjustment, substantially as described.

2. A picture-hanger comprising an approximately U-shaped frame adapted to be attached to the bottom of a picture and having sides and a transverse portion, a bail connected to the top of the frame and adapted to be fastened to the top of the picture, and an adjustable bail adapted to be suspended from a hook and having sides provided with eyes to receive the sides of the frame and to slide thereon and provided with a series of hooks adapted to engage the transverse portion of the frame, substantially as described.

3. A picture-hanger comprising an approximately U-shaped frame having a transverse portion and adapted to have its lower end attached to the bottom of a picture, a V-shaped bail hinged to the transverse portion and provided at its apex with a U-shaped bend to be fastened to the top of a picture, an adjustable bail having the upper ends of the sides converging and having its sides bent to form a series of hooks and provided with eyes to receive the sides of the frame and to slide thereon, and a transverse brace connecting the sides of the adjustable bail, substantially as described.

In testimony that I claim the foregoing as my own I have hereto affixed my signature in the presence of two witnesses.

ELWIN A. SNOW.

Witnesses:
 JAMES M. STOUT,
 WILLIAM E. DEAN.